(12) United States Patent
Vargantwar (10) Patent No.: US 8,478,275 B1
(45) Date of Patent: Jul. 2, 2013

(54) CONDITIONAL ASSIGNMENT OF CONNECTION IDENTIFIERS TO HELP AVOID COMMUNICATION ERRORS

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 392 days.

(21) Appl. No.: 12/851,223

(22) Filed: Aug. 5, 2010

(51) Int. Cl.
*H04W 36/00* (2009.01)

(52) U.S. Cl.
USPC .......................................... 455/438; 370/254

(58) Field of Classification Search
USPC ........... 455/436, 432.1, 439, 437, 438, 435.1, 455/435.2, 442
See application file for complete search history.

(56) References Cited

U.S. PATENT DOCUMENTS

| | | |
|---|---|---|
| 4,765,753 A | 8/1988 | Schmidt |
| 5,392,331 A | 2/1995 | Patsiokas et al. |
| 5,434,950 A | 7/1995 | Kaallman |
| 5,459,759 A | 10/1995 | Schilling |
| 5,508,708 A | 4/1996 | Ghosh et al. |
| 5,513,246 A | 4/1996 | Jonsson et al. |
| 5,539,744 A | 7/1996 | Chu et al. |
| 5,640,676 A | 6/1997 | Garncarz et al. |
| 5,650,770 A | 7/1997 | Schlager et al. |
| RE35,916 E | 10/1998 | Dennison et al. |
| 5,901,354 A | 5/1999 | Menich et al. |
| 5,963,130 A | 10/1999 | Schlager et al. |
| 5,982,758 A | 11/1999 | Hamdy |
| 6,026,301 A | 2/2000 | Satarasinghe |
| 6,055,428 A | 4/2000 | Soliman |
| 6,075,989 A | 6/2000 | Moore et al. |
| 6,075,990 A | 6/2000 | Shin |
| 6,088,594 A | 7/2000 | Kingdon et al. |
| 6,088,694 A | 7/2000 | Burns et al. |
| 6,137,783 A | 10/2000 | Sallberg |
| 6,151,498 A | 11/2000 | Roel-Ng et al. |
| 6,167,268 A | 12/2000 | Souissi et al. |
| 6,185,421 B1 | 2/2001 | Alperovich et al. |
| 6,195,342 B1 | 2/2001 | Rohani |
| 6,198,390 B1 | 3/2001 | Schlager et al. |
| 6,269,087 B1 | 7/2001 | Nakamura et al. |
| 6,285,874 B1 | 9/2001 | Magnusson et al. |
| 6,321,090 B1 | 11/2001 | Soliman |
| 6,324,404 B1 | 11/2001 | Dennison et al. |
| 6,351,642 B1 | 2/2002 | Corbett et al. |

(Continued)

FOREIGN PATENT DOCUMENTS

EP 0 926 844 A2 12/1998

OTHER PUBLICATIONS

Akyildiz et al., "Mobility Management in Next-Generation Wireless Systems," Proceedings of the IEEE, vol. 87, No. 8, pp. 1347-1384, Aug. 1999.

(Continued)

*Primary Examiner* — Tu X Nguyen (57) ABSTRACT

A method and system for helping to avoid communication errors, by ensuring that when a connection identifier (such as a Walsh code or MAC Index) is being assigned to a wireless access terminal for use in a wireless coverage area having a particular coverage-area identifier (such as a particular PN offset), the same connection identifier is not currently assigned to another access terminal in another nearby coverage area that has the same coverage-area identifier.

20 Claims, 4 Drawing Sheets

U.S. PATENT DOCUMENTS

| | | | |
|---|---|---|---|
| 6,353,601 B1 | 3/2002 | Siira | |
| 6,360,098 B1 | 3/2002 | Ganesh et al. | |
| 6,363,255 B1 | 3/2002 | Kuwahara | |
| 6,377,560 B1 | 4/2002 | Dailey | |
| 6,449,305 B1 | 9/2002 | Menich et al. | |
| 6,473,619 B1 | 10/2002 | Kong et al. | |
| 6,493,554 B1 | 12/2002 | Kanerva et al. | |
| 6,498,785 B1 | 12/2002 | Derryberry et al. | |
| 6,522,888 B1 | 2/2003 | Garceran et al. | |
| 6,549,781 B1 | 4/2003 | O'Byrne et al. | |
| 6,570,862 B2 | 5/2003 | Virtanen | |
| 6,594,253 B1 | 7/2003 | Sallberg et al. | |
| 6,597,906 B1 | 7/2003 | Van Leeuwen et al. | |
| 6,631,263 B1 | 10/2003 | Corkery | |
| 6,667,962 B1 | 12/2003 | Lee et al. | |
| 6,714,789 B1 | 3/2004 | Oh et al. | |
| 6,731,622 B1 | 5/2004 | Frank et al. | |
| 6,836,661 B2 | 12/2004 | Mohebbi | |
| 6,876,853 B2 | 4/2005 | Hokkanen | |
| 6,934,546 B1 | 8/2005 | Corbett et al. | |
| 6,950,664 B2 | 9/2005 | Chen et al. | |
| 6,999,766 B1 | 2/2006 | Padovani | |
| 7,076,256 B1 | 7/2006 | Orler et al. | |
| 7,092,722 B1 | 8/2006 | Oh et al. | |
| 7,180,879 B2 | 2/2007 | Sinnarajah et al. | |
| 7,333,797 B2 | 2/2008 | Thorson | |
| 7,536,167 B2 | 5/2009 | Gollnick et al. | |
| 7,787,421 B2 | 8/2010 | Ramanna et al. | |
| 7,801,487 B2 | 9/2010 | Mehrabanzad et al. | |
| 2002/0027889 A1 | 3/2002 | Yun et al. | |
| 2002/0102976 A1 | 8/2002 | Newbury et al. | |
| 2002/0198004 A1 | 12/2002 | Heie et al. | |
| 2003/0017831 A1 | 1/2003 | Lee et al. | |
| 2003/0017837 A1 | 1/2003 | Kalliojarvi | |
| 2003/0035393 A1 | 2/2003 | Sinnarajah et al. | |
| 2003/0060235 A1 | 3/2003 | Yamato et al. | |
| 2003/0119535 A1 | 6/2003 | Needham et al. | |
| 2004/0067759 A1 | 4/2004 | Spirito et al. | |
| 2004/0110511 A1 | 6/2004 | Schmidt et al. | |
| 2005/0271012 A1 | 12/2005 | Agrawal et al. | |
| 2006/0068813 A1 | 3/2006 | Ku et al. | |
| 2006/0217118 A1 | 9/2006 | Benco et al. | |
| 2007/0287462 A1 | 12/2007 | Gorokhov et al. | |
| 2008/0014946 A1 | 1/2008 | Kubota | |
| 2008/0076436 A1 | 3/2008 | Sanders et al. | |
| 2008/0113670 A1 | 5/2008 | Dufour et al. | |
| 2008/0123851 A1 | 5/2008 | Guccione et al. | |
| 2008/0146252 A1 | 6/2008 | Razdan et al. | |
| 2008/0160998 A1* | 7/2008 | Jovanovic | 455/436 |
| 2008/0293435 A1 | 11/2008 | Maher et al. | |
| 2009/0219888 A1 | 9/2009 | Chen et al. | |
| 2010/0008235 A1* | 1/2010 | Tinnakornsrisuphap et al. | 370/241 |

OTHER PUBLICATIONS

Angus, "ReFLEX™ & IEEE 802.11—How ReFLEX NPCS networks can make Wi-Fi better," http://www.braddye.com/ReFLEX_802_4s.pdf, printed from the World WideWeb on Jan. 23, 2004.

Angus, "ReFLEX™ & IEEE 802.11—How ReFLEX NPCS networks can make Wi-Fi better," printed from the World Wide Web on Oct. 28, 2003.

Garg et al., "Applications of CDMA in Wireless/Personal Communications—Evolution of CDMA Technology for Wireless Communications," Prentice Hall PTR, Chapter 13, pp. 334-336, 1997.

La Porta et al., "Comparison of Signaling Loads for PCS Systems," http://citeseer.nj.nec.com/cache/papers/cs/11341/http:zSzSzwww.bell-labs.comzSzuserzSztipzSzpcs_Id.fm.pdf/porta95comparison.pdf, printed from the World Wide Web on Oct. 28, 2003.

Lin et al., "Comparing Soft and Hard Handoffs," http://citeseer.nj.nec.com/cache/papers/cs/8464/http:zSzzSzliny.csie.nctu.edu.twzSztv97c.pdf/submitted-to-ieee-trans.pdf, printed from the World Wide Web on Oct. 28, 2003.

Ramjee et al., "Performance Evaluation of Connection Rerouting Schemes for ATM-Based Wireless Networks," IEEE/ACM Transactions on Networking, vol. 6, No. 3, pp. 249-261, Jun. 1998.

Ramjee, "Supporting connection Mobility in Wireless Networks," Dissertation submitted to the Graduate School of the University of Massachusetts Amherst in partial fulfillment of the requirements for the degree of Doctor of Philosophy, pp. 1-154, May 1997.

Trotter and Cravatts, "A Wireless Adapter Architecture for Mobile Computing," http://www.usenix.org/publications/library/proceedings/mob95/full_papers/trotter txt, printed from the World Wide Web on Oct. 28, 2003.

Oh, "5 CDMA," http://edu.hansung.ac.kr/~jtoh/mobile/ch5.ppt, printed from the World Wide Web on Dec. 16, 2003.

Das et al., "Dynamic Load Balancing Through Coordinated Scheduling in Packet Data Systems," http://www.ieee-infocom.org/2003/papers/19_04.pdf, printed from the World Wide Web on Dec. 16, 2003.

Bedell, a reference excerpt taken from the book titled "Cellular/PCS Management, A Real World Perspective," http:www.privateline.com/Cellbasics/CDMAmanage.pdf, printed from the World Wide Web on Oct. 28, 2003.

Hsiao-Kuang Wu, et al., "Personal Paging Area Design Based on Mobile's Moving Behaviors," IEEE INFOCOM, vol. 1, pp. 21-30, 2001.

I.F. Akyildiz, et al., abstract of "Movement-based location update and selective paging for PCSnetworks," IEEE/ACM Transactions, vol. 4, issue 4, Aug. 1996.

* cited by examiner

CONDITIONAL ASSIGNMENT OF CONNECTION IDENTIFIERS TO HELP AVOID COMMUNICATION ERRORS

BACKGROUND

To provide cellular wireless communication service, a wireless service provider typically operates a radio access network (RAN) that defines one or more wireless coverage areas in which access terminals can be served by the RAN and can thereby communicate with other access terminals and obtain connectivity with broader networks such as the public switched telephone network (PSTN) and the Internet.

A typical RAN may include one or more base transceiver stations (BTSs) (e.g., macro network cell towers and/or femtocells), each of which may radiate to define one or more wireless coverage areas such as cells and cell sectors in which wireless access terminals (ATs) can operate. Further, the RAN may include one or more base station controllers (BSCs), radio network controllers (RNCs) or the like, which may be integrated with or otherwise in communication with the BTSs and may include or be in communication with a switch or gateway that provides connectivity with one or more transport networks. Conveniently with this arrangement, a cell phone, personal digital assistant, wirelessly equipped computer, or other access terminal (whether or not actually operated by a user) that is positioned within coverage of the RAN can then communicate with a BTS and in turn, via the BTS, with other served devices or with other entities on the transport network.

In general, a RAN will communicate with served access terminals according to an agreed air interface protocol, examples of which include CDMA (E.G., 1xRTT or 1xEV-DO), iDEN, WiMAX, LTE, TDMA, AMPS, GSM, GPRS, UMTS, or EDGE, and others now known or later developed. Communications in the direction from the RAN to access terminals define a "forward link", while those in the direction from access terminals to the RAN define a "reverse link".

A typical air interface protocol will provide a mechanism to distinguish communications in one coverage area from those in adjacent coverage areas and to distinguish between communications within a given coverage area. Under some air interface protocols, for instance, each coverage area may have a coverage-area identifier that distinguishes the coverage area from adjacent coverage areas, and communications in the coverage area may designate or be encoded with that coverage-area identifier in order to distinguish the communications from those in adjacent coverage areas. Likewise, each air interface connection (e.g., communication channel or other assigned connection resource) in a coverage area may have by a radio-link identifier, and communications carried on that connection may designate or be encoded with that radio-link identifier in order to distinguish the communications from others in the coverage area.

For example, under the CDMA 1xRTT protocol, each sector has a locally unique pseudonoise offset ("PN offset") that is used to encode communications in the sector in a manner that distinguishes from communications in adjacent sectors, and each sector defines various control channels and traffic channels that are each encoded with a respective "Walsh code". As another example, under the CDMA 1xEV-DO protocol, each sector similarly has a PN offset that distinguishes communications in the sector from those in adjacent sectors, and each sector designates connections assigned to various access terminals by respective "MAC Indexes" (which may translate to Walsh codes similarly used to encode communications). Other examples are possible as well.

A RAN will typically broadcast a pilot signal respectively in each coverage area, to enable access terminals to detect and evaluate cellular coverage. Further, the pilot signal of each coverage area may embody or designate the coverage-area identifier, so that access terminals can determine which coverage area is emitting the pilot signal. Under CDMA, for instance, the RAN may broadcast in each sector a pilot signal encoded with the sector's PN offset, so that if an access terminal detects a pilot signal encoded with that PN offset, the access terminal may determine that the PN offset is the coverage-area identifier of the sector that is emitting the pilot signal.

In an "idle" or "dormant" state where an access terminal is not actively engaged in a call or other communication session, the access terminal may regularly monitor the strength (e.g., signal-to-noise ratio (SNR)) of various pilot signals in search of a strongest pilot signal and thus a best coverage area in which to operate. If and when the access terminal then seeks to initiate a communication session, the access terminal may send a connection request (e.g., origination request) on an access channel of the selected coverage area, requesting the RAN to assign or otherwise establish a connection for the session. In response, the RAN may then assign a particular radio-link identifier (e.g., traffic channel or connection identifier, such as Walsh code or MAC Index) to the access terminal to be used in the coverage area, thereby transitioning the access terminal to an "active" state.

In the active state, when the access terminal is operating with an assigned connection in a given coverage area, the access terminal may regularly monitor the strength (e.g., SNR) of the pilot signal in that coverage area and the strengths of the pilot signals in neighboring coverage areas. If the pilot signal from another coverage area becomes sufficiently stronger than the pilot signal from the current serving coverage area (e.g., as a result of the access terminal moving toward the adjacent coverage area), the access terminal may then engage in control channel signaling with the RAN to arrange for a handoff of the communication session from the current coverage area to the other coverage area.

Under certain air interface protocols, such as CDMA for instance, an access terminal can operate actively in more than one coverage area at a time. Such an arrangement helps when the access terminal passes through an area of overlap between two or more coverage areas, as the access terminal may then engage in a "soft handoff" process that involves switching to communicate in a new coverage area before discontinuing communication in a previous coverage area. Further, soft handoff provides other advantages, such as allowing the access terminal and/or RAN to combine together or select the best quality of communications carried out simultaneously in the multiple coverage areas.

To facilitate soft handoff, an access terminal may maintain in its memory an "active set" that lists the coverage areas in which the access terminal has an active connection, and the RAN may likewise maintain a record of the access terminal's active set and will communicate with the access terminal in each listed coverage area. The active set may designate each coverage area by its coverage-area identifier and may further designate the connection assigned to the access terminal in that coverage area by its radio-link identifier. Generally, an active set may be limited in size to some defined number of coverage areas, such as three or six for instance.

In practice, the RAN may also provide the access terminal with a "neighbor list" that lists coverage areas neighboring (adjacent to or otherwise nearby) those in the access terminal's active set, designating each neighboring coverage area by its coverage-area identifier. The access terminal may then regularly evaluate the strength of pilot signals emitted by each coverage area of its active set and the strength of pilot signals emitted by each coverage area listed in the neighbor list, as well as the strength of other (remaining) pilot signals that the access terminal detects even if not listed in the access terminal's active set or neighbor list. If the access terminal thereby detects a pilot signal that is sufficiently strong compared with the weakest of the access terminal's active set members, the access terminal may then engage in signaling with the RAN to arrange for soft handoff to the detected coverage area and perhaps removal of the weaker coverage area from the access terminal's active set.

When an access terminal begins a communication session, the access terminal's active set may consist of just the coverage area in which the access terminal sent its connection request. At that point, the BTS serving that coverage area may provide the access terminal with a neighbor list designating neighbors of that one coverage area. As the communication session proceeds, the access terminal may then detect other coverage areas and arrange for addition of those other coverage areas to its active set through soft handoff.

Alternatively, a session can be initiated through a process known as "channel assignment into soft handoff" (CASHO), where the access terminal begins the session in a soft handoff state (having multiple coverage areas in its active set) rather than transitioning to that state over time in the session. In the CASHO process, the access terminal identifies multiple candidate coverage areas to initially include in its active set and, when requesting a connection in a particular coverage area, the access terminal provides the serving BTS with a list of the identified coverage areas (each designated by coverage-area identifier). The RAN may then establish a connection for the access terminal respectively in each identified coverage area, so that the access terminal can begin the communication session in a soft handoff state, active in multiple coverage areas at once.

In addition, as an access terminal operates with an assigned connection in any given coverage area, the access terminal and RAN will typically engage in a power control process to control the transmission power used for communication on that connection in that coverage area. Optimally, this power control process will help to keep the communication strong enough to overcome interference from other communications in the coverage area and from topographical obstructions, and will also help to prevent the communication from becoming so strong that it would unduly interfere with other communications.

In practice, for example, the RAN may regularly monitor the SNR of traffic channel communications that the RAN receives from the access terminal in a given coverage area and compare the SNR to a power control setpoint. If the SNR is lower than the power control setpoint, then the RAN may send to the access terminal a power control command that directs the access terminal to decrease the access terminal's transmission power on the assigned connection in that coverage area. On the other hand, if the SNR is higher than the power control setpoint, then the RAN may send to the access terminal a power control command that directs the access terminal to increase the access terminal's transmission power on the assigned connection in the coverage area.

The RAN may provide these power control commands to the access terminal in various ways. For example, the RAN may provide a power control command to the access terminal by transmitting the power control command on a forward link power control channel and including with the command a specification of the access terminal's radio-link identifier (e.g., MAC Index) to designate which access terminal in the coverage area is to receive the power control command. Alternatively, the RAN may provide the power control command as an overhead message in a channel that otherwise designates or embodies the access terminal's assigned radio-link identifier, such as in a channel encoded with a Walsh code assigned to the access terminal.

When an access terminal is concurrently active in multiple coverage areas, the access terminal may adjust its transmission power up or down in all of its active set coverage areas in a coordinated manner, by considering power control commands that it receives in its various active set coverage areas. In some CDMA systems, for instance, an access terminal may be arranged to increase its transmission power in all of its active set sectors if the access terminal receives power-up commands in all of those sectors, but to decrease its transmission power in all of its active sectors if the access terminal receives a power-down command in any one or more of the sectors.

The rationale for this coordination of power control across active set sectors is that if the RAN sends a power-down command to the access terminal in any sector, that means the RAN is receiving communications in that sector strongly enough from the access terminal to permit the power decrease and to still allow communication to occur in that sector. Thus, even if decreasing reverse link power in the access terminal's other active set sectors would deteriorate the quality of the access terminal's communication in those other sectors, the quality in the sector that sent the power-down command should suffice to adequately carry the access terminal's communications to the RAN. Meanwhile, decreasing reverse link power in the access terminal's other active set sectors may help to reduce interference on the air interface generally.

OVERVIEW

In some situations, an access terminal may ask to operate in a coverage area that the access terminal designates by a particular coverage-area identifier (e.g., a PN offset or other identifier) but the RAN may not know with certainty which coverage area the access terminal means. This can happen, for instance, in a soft handoff situation where an access terminal detects a sufficiently strong pilot that embodies or designates a coverage-area identifier but where that identifier is not listed in a neighbor list of the access terminal's current serving coverage area, and where there are at least two coverage areas in the vicinity that have that coverage-area identifier.

For instance, in the CASHO process, if an access terminal sends a connection request to coverage area A and specifies coverage-area identifier B as the identifier of another coverage area to be included initially along with coverage area A in the access terminal's active set, an ambiguity may arise if coverage-area identifier B is not listed in the neighbor list of coverage area A and if there are multiple coverage areas in the vicinity that have coverage-area identifier B. Likewise, if an access terminal is currently active in coverage areas A, B, and C, and sends a handoff request designating coverage-area identifier D as a handoff target, an ambiguity would arise if coverage-area identifier D is not listed in the combined neighbor list of coverage areas A, B, and C, and if there are multiple coverage areas in the vicinity that have coverage-area identifier D.

If the RAN determines that multiple coverage areas in the vicinity have the coverage-area identifier specified by the access terminal and if the coverage-area identifier is not listed in an applicable neighbor list, the RAN may try to determine which of the coverage areas is most likely the one from which the access terminal received a pilot signal that triggered the access terminal's CASHO or handoff request. For instance, the RAN may consider base station antenna locations and directions of radiation in relation to the location of the access terminal, or the RAN may consider other factors. Ultimately, the RAN may thereby select a coverage area that the RAN concludes is the one intended by the access terminal's designation of the coverage-area identifier. Alternatively, even without detecting the fact that there are multiple coverage areas in the vicinity that have the specified coverage-area identifier and/or without noting absence of the coverage-area identifier from an applicable neighbor list, the RAN may conclude that the specified identifier designates a particular coverage area in the vicinity.

Unfortunately, however, in these or other situations, the RAN may err in its determination of which coverage area the access terminal intended to designate when the access terminal specified the coverage-area identifier. For instance, in the first example above, given two coverage areas 1 and 2 in the vicinity that each have coverage-area identifier B, the access terminal may have received the threshold strong pilot signal in coverage area 1, but the RAN may somehow conclude that the access terminal was designating coverage area 2.

When this error occurs, the RAN may assign to the access terminal a radio-link identifier in the wrong coverage area. In particular, the access terminal would assume that the assigned radio-link identifier is for communication in coverage area 1, but the RAN will be using the radio-link identifier for communication to the access terminal in coverage area 2. As a result, the RAN and access terminal would not properly communicate with each other, since the RAN will be communicating to the access terminal using the radio-link identifier in coverage area 2 while the access terminal will be expecting communications using the radio-link identifier in coverage area 1.

This error can cause problems with the power control process described above. In particular, if the RAN assigns a radio-link identifier to an access terminal for use in coverage area 2, but if the access terminal is actually operating in coverage area 1, the access terminal may begin monitoring coverage area 1 for power control commands that are sent using the assigned radio-link identifier, and the access terminal may erroneously respond to any such power control commands that it receives in coverage area 1.

The risk here is that the RAN may have already assigned that same radio-link identifier to some other access terminal in coverage area 1, and, since the access terminal at issue is monitoring coverage area 1 for power control commands sent using the assigned radio-link identifier, the access terminal at issue may receive and wrongly process power control commands that the RAN actually intended for the other access terminal. This could be a particular problem if the access terminal at issue thereby receives and processes a power-down command, especially if the access terminal has weak coverage and should not be reducing its transmission power. Faced with such a power-down command, according to the coordinated power control process described above, the access terminal would comply by reducing its transmission power in all of its active set coverage areas. But as a result, the access terminal's transmissions in all of its active set coverage areas may be too weak for the RAN to receive, and as a result the access terminal may experience a dropped call or other loss of session.

Disclosed herein is method and corresponding system to help avoid this problem. In accordance with the method, when a RAN selects a radio-link identifier (e.g., MAC Index, Walsh code, or other radio-link identifier) to assign to an access terminal for use in a coverage area having a particular coverage-area identifier, the RAN will check to ensure that, in another coverage area having the same coverage-area identifier, the same radio-link identifier is not currently assigned to another access terminal.

By ensuring that the same radio-link identifier is not currently assigned in the other coverage area having the same coverage-area identifier, the RAN will thereby avoid a scenario where data sent using the radio-link identifier in the other coverage area is wrongly received and processed by the access terminal.

For instance, with the first example discussed above, when the RAN is going to assign a particular radio-link identifier to the access terminal in coverage area 2 having coverage-area identifier B, the RAN may check to ensure that the same radio-link identifier is not currently assigned to another access terminal in coverage area 1 (also having the same coverage-area identifier B). By ensuring that the radio-link identifier assigned to the access terminal in coverage area 2 is not currently assigned to another access terminal in coverage area 1, the RAN can help to avoid a situation where a power-down command that is sent using that radio-link identifier in coverage area 1 but that is intended for another access terminal is wrongly received and processed by the access terminal at issue.

These as well as other aspects, advantages, and alternatives will become even more apparent to those skilled in the art by reading the following detailed description with reference where appropriate to the accompanying drawings. Further, it should be understood that the description throughout this document, including in this overview, is intended to illustrate the present method and system by way of example only and not by way of limitation.

DETAILED DESCRIPTION

Figure 1:
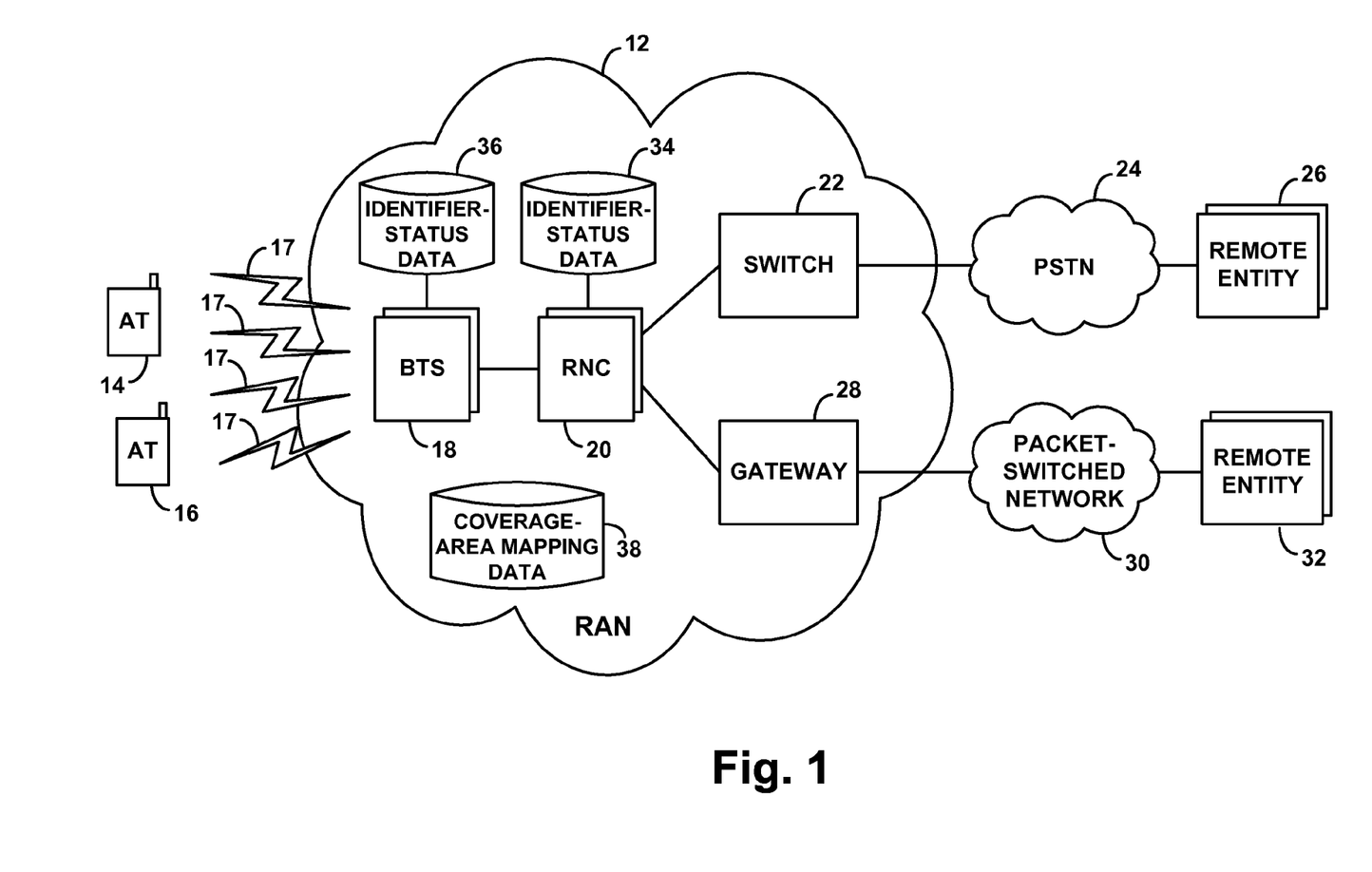
FIG. 1 is a simplified block diagram of a communication system in which an exemplary embodiment of the method can be implemented.

Referring to the drawings, FIG. 1 depicts a cellular communication system in which aspects of the exemplary method can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide multiple access terminals with wireless communication service. FIG. 1 depicts two representative access terminals 14, 16 by way of example, either or each of which could be a cell phone, wirelessly equipped PDA, or other type of wirelessly-equipped device now known or later developed. Each access terminal is equipped with hardware, software, and/or other logic to communicate with RAN 12 in accordance with an agreed air interface communication protocol, such as CDMA (e.g., 1xRTT, 1xEV-DO, etc.), iDEN, WiMAX, TDMA, AMPS, GSM, GPRS, UMTS, EDGE, LTE, or any other communication protocol now known or later developed.

RAN 12 includes one or more BTSs 18 that radiate to define a plurality of wireless coverage areas (e.g., cell sectors) 17 in which access terminals can communicate with the RAN. The BTSs may define these coverage areas discretely through use of directional antennas and/or by various modulation parameters, including, without limitation, carrier frequencies and PN offsets and/or other parameters, depending on the air interface protocol used.

In an example implementation, each coverage area will have a coverage-area identifier that distinguishes the coverage area from adjacent coverage areas. Further each coverage area is arranged to support multiple radio links or connections, distinguished from each other by radio-link identifiers (e.g., Walsh codes, MAC Indexes, or other identifiers). When an access terminal operates in a given coverage area, forward link communications from the BTS to the access terminal may be carried on a given frequency and may designate or embody the coverage area's coverage-area identifier and an applicable radio-link identifier.

In a CDMA 1xRTT system, for instance, each coverage area operating on a given carrier frequency will have a respective PN offset, and each forward link air interface channel in the coverage area will have respective a Walsh code, such that multiple Walsh coded channels may exist concurrently. To transmit communications on a given channel in a particular coverage area, the RAN will thus encode (e.g., spread spectrum modulate) the communications using the coverage area's PN offset and the channel's Walsh code and will transmit the resulting communications on the coverage area's carrier frequency. Correspondingly, an access terminal that is arranged to receive on that channel will tune to the carrier frequency and demodulate communications using the coverage area's PN offset and the channel's Walsh code.

In this manner, an access terminal may receive and evaluate a pilot signal that the RAN transmits in the coverage area on a particular Walsh code. Further, the RAN may assign the access terminal a Walsh code for a traffic channel, and the RAN may then communicate bearer traffic to the access terminal on that traffic channel, encoded with the assigned Walsh code. Further, during the course of an active communication session, the RAN may communicate power control commands to the access terminal as overhead data in the assigned traffic channel, and the access terminal will receive and respond to those power control commands.

In a CDMA 1xEV-DO system, each coverage area on a given carrier frequency may likewise have a respective PN offset. Under 1xEV-DO, however, forward link bearer traffic communications are transmitted in a time-division multiplexed format, with the full power of the coverage area being devoted to transmission to a single access terminal at a time. Further, a recurring time segment on the 1xEV-DO forward link defines a broadcast "MAC channel" and, within the MAC channel, a power-control sub-channel.

In practice, when an access terminal establishes a connection in a particular 1xEV-DO coverage area, the RAN assigns to the access terminal a MAC Index for use in the coverage area. During the connection, the RAN then transmits power-control commands to the access terminal by sending the commands in the power-control sub-channel using a Walsh code that corresponds with the access terminal's assigned MAC Index. The access terminal will thus monitor the power control sub-channel for power control commands that are sent with the access terminal's assigned MAC Index, and the access terminal will respond to those power control commands.

Returning to FIG. 1, the BTSs 18 are shown coupled with one or more RNCs 20, and the RNCs 20 are shown coupled with a switch 22 and a gateway 28. The switch 22 is then shown providing connectivity with the PSTN 24 so as to facilitate communication with remote entities 26, and the gateway 28 is shown providing connectivity with a packet-switched network 30 such as the Internet so as to facilitate communication with other remote entities 32.

In typical practice, each RNC may control one or more BTSs and may work with the BTSs to manage aspects of air interface operation such as assignment of radio-link identifiers, handoff between coverage areas, and power control. Further, the switch or gateway may work with the RNCs to manage various aspects of RAN operation as well. Ultimately, the extent to which various RAN functions are carried out by an RNC, a BTS, a switch, a gateway, and/or one or more other RAN components may vary from implementation to implementation and is therefore not critical to an understanding or definition of the present method.

By way of example, for each coverage area, the BTS serving the coverage area may function to assign radio-link identifiers (e.g., Walsh codes or MAC Indexes), but a higher level component such as an RNC or switch may coordinate, monitor, or otherwise help to manage those assignments. For instance, an RNC or switch may maintain or have access to identifier-status data (i.e., identifier-assignment records) 34 that lists the various radio-link identifiers in each coverage area and indicates an assignment status of each radio-link identifier such as whether the identifier is currently assigned in the coverage area and, if so, to which access terminal. Further, each BTS may similarly maintain or have access to identifier-status data 36 for the radio-link identifiers in its coverage areas.

When an access terminal sends a connection request in a coverage area, the BTS serving that coverage area may then forward the connection request to the RNC, and, upon approval by the RNC or switch, the BTS may assign an available radio-link identifier to the access terminal and may notify the RNC or switch of the assignment. The BTS and RNC or switch may then update their respective identifier-status records to show that the radio-link identifier is currently assigned to the access terminal. In turn, when the connection ends, the BTS and the RNC or switch may revise their records to show that the radio-link identifier is currently unassigned and available.

As further shown in FIG. 1, RAN 12 may include a set of coverage area mapping data 38. The coverage area mapping data may be designate various coverage areas by coverage-area identifier and may specify various data regarding the location and scope of each coverage area. For instance, the data may specify for each coverage area a location of the coverage area, such as a location of the BTS that radiates to define the coverage area, a likely geographic scope of the coverage area, and other data regarding the coverage area. This data may be established through field testing or other means. Further, the data could be maintained in one or more of the illustrated RAN components and/or can be replicated throughout the RAN.

Figure 2:
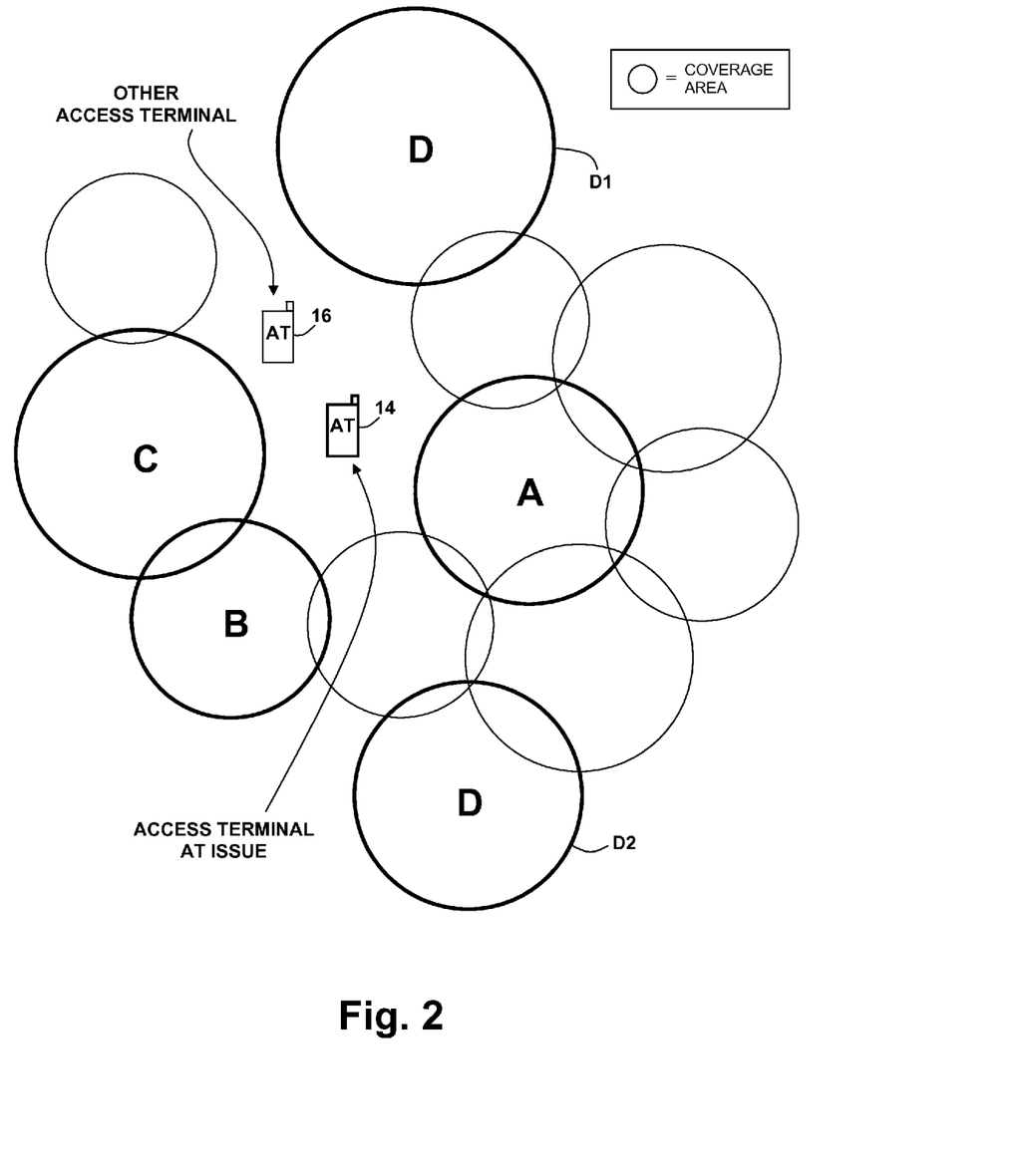
FIG. 2 is a conceptual illustration of a region having multiple wireless coverage areas, n which the exemplary method can be implemented.

FIG. 2 is a conceptual illustration of a region having multiple wireless coverage areas, to help explain implementation of the present method in practice. These coverage areas may be cell sectors, cells, clusters, or some other type of coverage areas.

In the illustration, the wireless coverage areas are represented by circles that denote the core or origin of each coverage area, such as the serving base station for instance. In practice, the actual scope of wireless coverage for each coverage area will be greater than that shown, to an extent depending on the power of base station transmission and the extent of air interface interference. The circles are shown with varying size, to indicate that some coverage areas may have greater or lesser scope than others.

As discussed above, each coverage area will have a coverage-area identifier that will be used to distinguish communications in the coverage area from those in adjacent coverage areas. By engineering design, coverage-area identifiers may be reused by coverage areas that are deemed to be sufficiently distant from each other. While that sufficient distance may thus prevent an access terminal from concurrently receiving pilot signals from multiple coverage areas that have the same identifier, confusion can still arise in a situation where an access terminal identifies a coverage area and the RAN does not know with certainty which coverage area the access terminal meant.

To help explain the method, FIG. 2 designates several coverage areas by representative coverage-area identifiers. Three of the coverage areas are shown respectively having coverage-area identifiers A, B, and C and will be referred to as coverage areas A, B, and C, while two other coverage areas are shown both having the same coverage-area identifier D. For reference, the coverage area D at the top of the figure will be referred to as coverage area D1, and the coverage area D at the bottom of the figure will be referred to as coverage area D2. Shown near the center of the figure are then access terminal 14 and 16. Access terminal 14 will be considered the access terminal at issue.

As an example scenario in this arrangement, assume that access terminal 14 is idling on coverage area A, meaning that access terminal 14 is idle and has determined that the pilot signal from coverage area A, having coverage-area identifier A, is the strongest. Further, assume that access terminal 14 is also receiving relatively strong pilot signals from coverage areas B, C, and D1 and has determined that the coverage-area identifiers of those coverage areas are B, C, and D respectively. In this scenario, assume that access terminal 14 then sends a CASHO request in coverage area A, seeking initiation of a connection (e.g., voice call or data session) and designates coverage-area identifiers B, C, and D.

Upon receipt of this CASHO request, the RAN may determine that coverage-area identifiers B and C are contained in a neighbor list of coverage area A, which leaves no doubt about which coverage areas the access terminal meant by those two identifiers. However, the RAN may determine that coverage-area identifier D is not contained in a neighbor list of coverage area A and perhaps that it is also not contained in neighbor lists of coverage areas B or C either. Further, by reference to the coverage area mapping data 38, the RAN may determine that there are at least two coverage areas in the vicinity that have coverage-area identifier D. In particular, the RAN may deem a coverage area to be in the vicinity if it is within some threshold distance of one or more of the other coverage areas at issue. For instance, the RAN may deem coverage areas D1 and D2 to be in the vicinity because they are both within the threshold distance of coverage area A where the CASHO request was received.

Without the present method, the RAN may next try to determine which of coverage areas D1, D2 the access terminal 14 meant by its designation of coverage-area identifier D. For one reason or another, however, the RAN may come to the incorrect conclusion that access terminal 14 was referring to coverage area D2. Thus, the RAN may erroneously select a radio-link identifier in coverage area D2 to assign to access terminal 14. Meanwhile, the RAN may also select a radio-link identifier in each of coverage areas A, B, and C to assign to access terminal 14 as well.

As a response to the CASHO request, the RAN may then transmit to access terminal 14 a message that specifies coverage areas A, B, C, D as the access terminal's initial active set for the requested connection, and that designates each coverage area by its coverage-area identifier and specifies for each coverage area the radio-link identifier that the RAN selected for use by the access terminal in the coverage area.

Upon receipt of this message, access terminal 14 will thus transition to an active state and begin communicating in each of the indicated coverage areas and receiving and responding to power control commands sent using its assigned radio-link identifier respectively in each of the indicated coverage areas. While this should work well for coverage areas A, B, and C, however, it will not work for coverage area D, because the RAN erred in its conclusion of which coverage area D the access terminal meant.

As explained above, a particular problem can arise in this scenario if the same radio-link identifier that the RAN assigned to access terminal 14 for coverage area D2 is currently assigned to another access terminal in coverage area D1, since access terminal 14 will be monitoring coverage area D1 for power control commands sent using that radio-link identifier. For instance, assume that the RAN has assigned the same radio-link identifier to access terminal 16 in coverage area D1. As a result, when the RAN sends a power control command using the radio-link identifier in coverage area D1, in an effort to control the transmission power of access terminal 16, access terminal 14 will receive and respond to the power control command because access terminal 14 is monitoring coverage area D1 for power control commands sent using that radio-link identifier. If the power control command is a power-down command and access terminal 14 is arranged to apply the coordinated power control process discussed above, access terminal 14 would then responsively reduce its transmission power in all of its active set coverage areas. In a worst case scenario, if access terminal 14 has poor coverage in all of its active set coverage areas, this may unfortunately result in a connection loss.

The present method can help to avoid this result by instead having the RAN ensure that the radio-link identifier that will be assigned to access terminal 14 in coverage area D2 is not currently assigned to another access terminal in coverage area D1. For instance, when the RAN receives from access terminal 14 a CASHO request that designates coverage-area identifier D, and the RAN concludes or assumes that the access terminal means by coverage-area identifier D to refer to coverage area D2, the RAN may then determine that other coverage area D1 with the same coverage-area identifier exists in the vicinity, and the RAN may then select a radio-link identifier in coverage area D2 that is not currently assigned to another access terminal in coverage area D1.

The RAN may operate in various ways to ensure that the radio-link identifier to be assigned in coverage area D2 is not currently assigned in coverage area D1.

For example, if the BTS serving coverage area D2 is the one that selects the radio-link identifier, the BTS may refer to the coverage area mapping data 38 to determine which BTS serves coverage area D1. The BTS may then query that other BTS to obtain a list of radio-link identifiers currently available (unassigned) by that other BTS in coverage area D1, and the BTS may select a radio-link identifier that is on the received list and that is also currently available in the BTS's own coverage area D2. That is, the BTS may select a radio-link identifier from the intersection of (i) the radio-link identifiers currently available in coverage area D1 and (ii) the radio-link identifiers currently available in coverage area D2. The BTS serving coverage area D2 may then assign the selected radio-link identifier for use by access terminal 14 in coverage area D2. (To facilitate CASHO response, the BTS may convey this selection and assignment to the BTS serving coverage area A, for reporting in the response to access terminal 14.)

Alternatively, the BTS may query a more central component or data store in the RAN in an effort to ensure that the radio-link identifier to be assigned in coverage area D2 is not currently assigned in coverage area D1. For instance, the BTS may query a serving RNC or switch, which may then refer to identifier-status data 34 to determine what radio-link identifier is available in both coverage area D1 and coverage area D2. Or the BTS may query centralized identifier-status data in some other manner to make this determination.

As another example, if an RNC or switch serving coverage areas D1 and D2 is the one that selects the radio-link identifier to assign in coverage area D2, the RNC or switch may refer to its own identifier-status data 34 to find a radio-link identifier that is currently available in both coverage area D1 and coverage area D2. Or the RNC or switch may query the BTSs serving coverage areas D1 and D2 to find a radio-link identifier that is currently available in both coverage areas. And the RNC or switch may then assign or cause a BTS to assign that selected radio-link identifier.

Advantageously, by ensuring that the radio-link identifier to be assigned to access terminal 14 in coverage area D2 is not currently assigned to another access terminal in other coverage area D1 that is in the vicinity, the present method helps avoid the scenario where access terminal 14 may wrongly receive and respond to power control commands intended for the other access terminal in coverage area D1. The method may have other advantages as well.

As another example of the present method, consider a scenario where access terminal 14 is currently active and has an active set of coverage areas A, B, and C. In that scenario, access terminal 14 may detect a sufficiently strong pilot signal from coverage area D1 and may responsively send a handoff request to the RAN, seeking handoff to a coverage area that access terminal 14 designates by coverage-area identifier D. As with the CASHO process described above, ambiguity can then arise as a result of coverage areas D1 and D2 both being in the vicinity and coverage-area identifier D not being on a neighbor list of coverage areas A, B, and C. Again in that scenario, the RAN may incorrectly conclude or assume that the access terminal meant to request handoff to coverage area D2, and so the RAN may process a handoff and assign a radio-link identifier in coverage area D2, which can once more lead to the above-discussed power control problem.

In this example scenario again, when the RAN is selecting a radio-link identifier to assign to the access terminal in coverage area D2, the RAN will ensure that the same radio-link identifier is not currently assigned to another access terminal in other coverage area D1 in the vicinity. Upon selecting a suitable radio-link identifier, the RAN may then assign the radio-link identifier to the access terminal. And advantageously again, this process will help to avoid the problem of the access terminal wrongly receiving and processing power control commands that are intended for another access terminal.

Furthermore, in practice, when the RAN selects and assigns a radio-link identifier in coverage area D2 that is not currently assigned in coverage area D1, the RAN may take the additional precaution of putting a hold on that radio-link identifier for use in coverage area D1. Putting a hold on the radio-link identifier may involve recording in identifier-status data an indication that the radio-link identifier is not currently available to be assigned in coverage area D1, even though it is not currently assigned in coverage area D1. Once the access terminal closes its connection or at the occurrence of some other triggering event such as the passage of a threshold period of time, the RAN may then automatically release the hold on the radio-link identifier to allow it to once again be assigned in coverage area D1.

Figure 3:
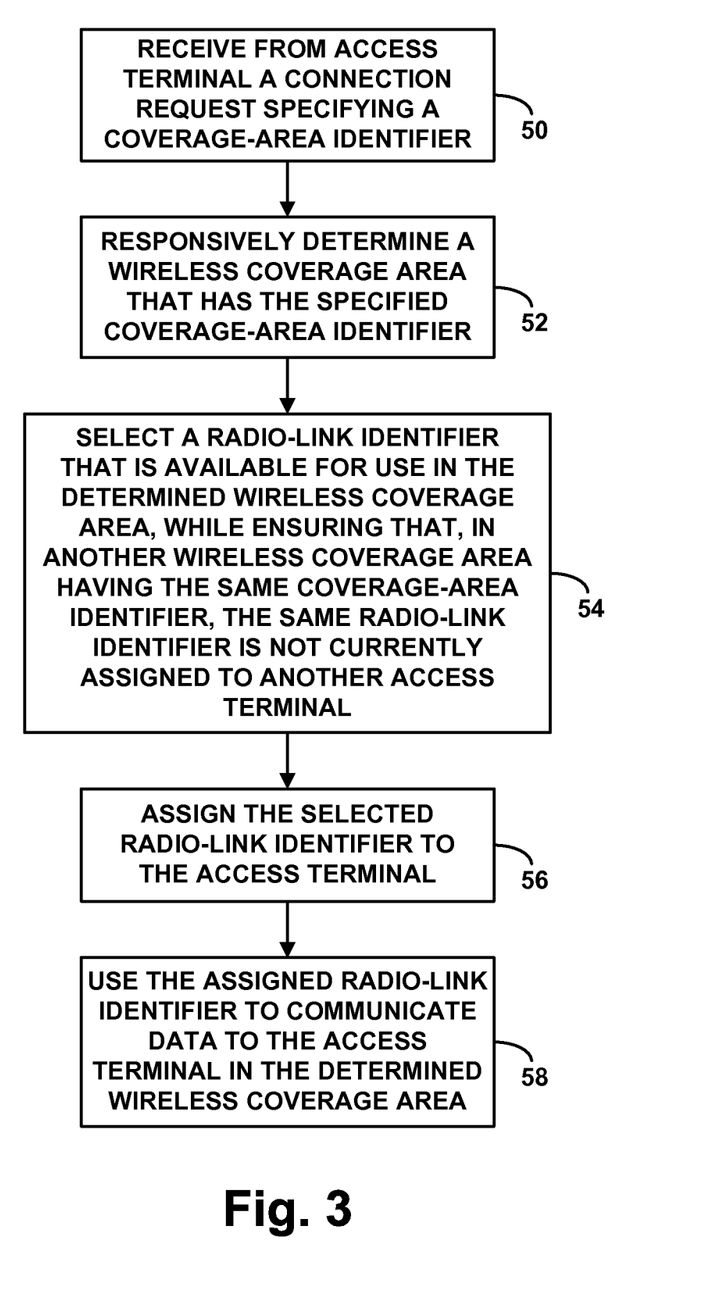
FIG. 3 is a flow chart depicting functions that can be carried out in accordance with the method.

FIG. 3 is next a flow chart summarizing some of these functions that can be carried out by one or more RAN components in accordance with the present method.

As shown in FIG. 3, at block 50, a RAN receives from an access terminal a connection request that specifies a wireless-coverage-area identifier. This connection request may be a CASHO request, a mid-connection handoff request, or another sort of connection request, transmitted on a reverse link access channel for instance. Further, the coverage-area identifier may be a PN offset or any other sort of coverage-area identifier.

Responsive to at least the request, at block 52, the RAN then determines a wireless coverage area that has the specified wireless coverage-area identifier and, at block 54, the RAN selects a radio-link identifier that is available for use in the determined wireless coverage area, while ensuring that, in another wireless coverage area having the same wireless coverage-area identifier, the same radio-link identifier is not currently assigned to another access terminal. This process may proceed in the manner discussed above for instance, or in some other manner, and the radio-link identifier may be a Walsh code, a MAC Index, or other type of radio-link identifier. Further, the RAN may carry out these functions further in response to determining that the specified coverage-area identifier is not in a neighbor list associated with the request, such as a neighbor list of a primary sector to which a CASHO request is sent or a neighbor list of active set coverage areas of the access terminal.

At block 56, the RAN then assigns the selected radio-link identifier to the access terminal. In particular, the RAN may update its own records to indicate that the radio-link identifier is assigned to the access terminal in the determined coverage area and is thus not currently available to be assigned to another access terminal in the determined coverage area. Further, the RAN may transmit an assignment message to the access terminal to inform the access terminal of the radio-link identifier, so that the access terminal may then monitor the determined coverage area for power control commands and other transmissions sent using the radio-link identifier.

At block 58, the RAN then uses the assigned radio-link identifier to communicate data to the access terminal in the determined wireless coverage area. As described above, for instance, the RAN may send to the access terminal communications that contain or embody (e.g., are encoded with or otherwise embody) the assigned radio-link identifier. The data that the RAN communicates to the access terminal using the radio-link identifier may include any type of bearer data, such as voice or other real-time or non-real media, and may further include control data such as power control commands for instance.

Various components of a RAN can work alone or in combination to carry out functions of the present method. Which components are involved may depend on the particular network arrangement and air interface protocol used. As noted above, for instance, aspects of the method can be carried out by a BTS, an RNC, a switch, or one or more other RAN components.

Figure 4:
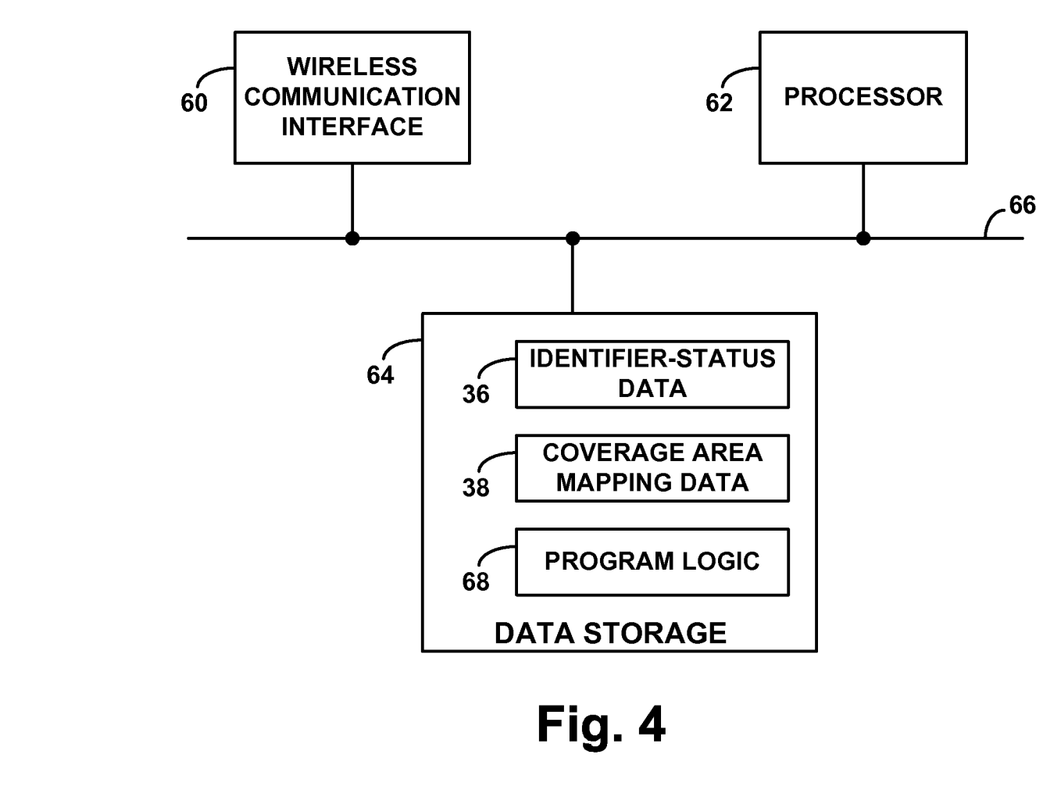
FIG. 4 is a simplified block diagram of a RAN arranged to implement the method.

FIG. 4 is a simplified block diagram depicting functional components of an exemplary RAN arranged to carry out the method. As shown, the RAN includes a wireless communication interface 60, a processor 62, and data storage 64, all of which may be communicatively linked together by a system bus or other connection mechanism 66. Although FIG. 4 depicts components as discrete boxes, it should be understood that the components can be integrated together or distributed to any extent desired, and that other variations are possible.

Wireless communication interface 60 includes one or more cell site modems, channel elements, power amplifiers, and antenna arrangements, cooperatively working to define and manage one or more wireless coverage areas such as cell sectors for instance in which the RAN can serve access terminals. Each wireless coverage area preferably has a respective coverage-area identifier (such as a PN offset or other identifier), which the RAN uses to distinguish communications in the coverage area from those in adjacent coverage areas.

Processor 62 comprises one or more general purpose processors and/or one or more special purpose processors (e.g., digital signal processors, application specific integrated circuits, etc.) Data storage 64, in turn, comprises one or more volatile and/or non-volatile storage components, such as magnetic, optical, or organic memory components. As shown, data storage 64 may include various data, including identifier-status data 36, coverage area mapping data 38, and program logic 68 executable by processor 62 to carry out various RAN functions.

In example operation, wireless communication interface 60 receives from an access terminal a connection request that specifies a coverage-area identifier, and passes the request to processor 62. Processor 62 then determines a wireless coverage area that has the specified coverage-area identifier, by reference to the coverage area mapping data 38 for instance. In turn, processor 62 selects a radio-link identifier (such as a Walsh code, MAC Index, or other identifier) that is available for use in the determined wireless coverage area, while ensuring that, in another wireless coverage area having the same coverage-area identifier, the same radio-link identifier is not currently assigned to another access terminal. Processor 64 then assigns the selected radio-link identifier to the access terminal, transmitting a response via wireless communication interface 60 to the access terminal to specify the radio-link identifier assignment. Wireless communication interface 60 then uses the radio-link identifier to communicate data, such as bearer data and power control commands, to the access terminal in the determined wireless coverage area.

Exemplary embodiments of the method have been described above. Those of ordinary skill in the art will appreciate, however, that modifications may be made to these embodiments while remaining within the scope defined by the claims.

I claim:

1. A method implemented by a radio access network (RAN) that radiates to define a plurality of wireless coverage areas, the method comprising:
    the RAN receiving from an access terminal (AT) a connection request specifying a wireless-coverage-area identifier;
    responsive to at least the request, (a) the RAN determining a wireless coverage area that has the specified wireless-coverage-area identifier and (b) the RAN (i) selecting a radio-link identifier that is available for use in the determined wireless coverage area, while (ii) ensuring that, in another wireless coverage area having the same wireless-coverage-area identifier, the same radio-link identifier is not currently assigned to another access terminal;
    responsive to the request, the RAN assigning the selected radio-link identifier to the AT; and
    the RAN using the assigned radio-link identifier to communicate data to the AT in the determined wireless coverage area.

2. The method of claim 1, wherein the wireless-coverage-area identifier comprises a pseudonoise (PN) offset.

3. The method of claim 2, wherein the radio-link identifier comprises a Walsh code.

4. The method of claim 2, wherein the radio-link identifier comprises a MAC Index.

5. The method of claim 1, wherein each coverage area is a cell sector.

6. The method of claim 1, wherein ensuring that, in the other wireless coverage area, the same radio-link identifier is not currently assigned to another access terminal comprises:
    determining that the other wireless coverage area has the same wireless-coverage-area identifier; and
    referring to identifier-assignment records to determine whether the same radio-link identifier is currently assigned in the other wireless coverage area, and thereby determining that the same radio-link identifier is not currently assigned in the other wireless coverage area.

7. The method of claim 1, wherein ensuring that, in the other wireless coverage area, the same radio-link identifier is not currently assigned to another access terminal comprises:
    determining that the other wireless coverage area has the same wireless-coverage-area identifier; and
    querying a node that serves the other wireless coverage area, to determine whether the same radio-link identifier is currently assigned in the other wireless coverage area, and thereby determining that the same radio-link identifier is not currently assigned in the other wireless coverage area.

8. The method of claim 1, wherein the determined coverage area has a first set of available radio-link identifiers and the other coverage area has a second set of available radio-link identifiers, and wherein selecting a radio-link identifier that is available for use in the determined wireless coverage area, while ensuring that, in the other wireless coverage area, the same radio-link identifier is not currently assigned to another access terminal comprises:
    selecting the radio-link identifier from an intersection of the first set and the second set.

9. The method of claim 1, further comprising placing a hold on the radio-link identifier in the other coverage area, to at least temporarily prevent assignment of the radio-link identifier in the other coverage area.

10. The method of claim 1, further comprising:
    the RAN determining that the wireless-coverage-area identifier is not in a neighbor list associated with the request; and
    the RAN carrying out functions (a) and (b) further in response to determining that the wireless-coverage-area identifier is not in the neighbor list.

11. The method of claim 1,
    wherein the request is a channel-assignment-into-soft-handoff (CASHO) request, wherein receiving the request comprises receiving the request in a particular wireless coverage area of the RAN, the particular wireless coverage area having a neighbor list, and wherein the coverage-area identifier is not listed in the neighbor list of the particular wireless coverage area.

12. The method of claim 11, further comprising:

the RAN determining that the wireless-coverage-area identifier is not listed in the neighbor list of the particular wireless coverage area; and the RAN carrying out functions (a) and (b) further in response to determining that the wireless-coverage-area identifier is not listed in the neighbor list of the particular wireless coverage area.

13. A radio access network (RAN) comprising a plurality of base transceiver stations radiating to define a plurality of wireless coverage areas for serving access terminals, each wireless coverage area having a respective coverage-area identifier, the RAN being arranged to receive from an access terminal (AT) a connection request specifying a coverage-area identifier;

the RAN being arranged to respond to at least the request by (a) determining a wireless coverage area that has the specified coverage-area identifier and (b) selecting a radio-link identifier that is available for use in the determined wireless coverage area, while ensuring that, in another wireless coverage area having the same coverage-area identifier, the same radio-link identifier is not currently assigned to another access terminal;

the RAN further being arranged to assign the selected radio-link identifier to the AT in response to the request; and the RAN being arranged to use the assigned radio-link identifier to communicate data to the AT in the determined wireless coverage area.

14. The RAN of claim 13, wherein the coverage-area identifier comprises a pseudonoise (PN) offset.

15. The RAN of claim 14, wherein the radio-link identifier comprises a Walsh code.

16. The RAN of claim 14, wherein the radio-link identifier comprises a MAC Index.

17. The RAN of claim 13, wherein each coverage area is a cell sector.

18. The RAN of claim 13, further comprising identifier-assignment data that indicates which radio-link identifiers are available in the other wireless coverage area, wherein the RAN is arranged to ensure that, in the other wireless coverage area, the same radio-link identifier is not currently assigned to another access terminal by referring to the identifier-assignment data.

19. The RAN of claim 13, wherein the determined coverage area has a first set of available radio-link identifiers and the other coverage area has a second set of available radio-link identifiers, and wherein the RAN is arranged to select the radio-link identifier by selecting the radio-link identifier from an intersection of the first set and the second set.

20. The RAN of claim 13, wherein the RAN is further arranged to place a hold on the radio-link identifier in the other coverage area, to at least temporarily prevent assignment of the radio-link identifier in the other coverage area.

\* \* \* \* \*